US011222116B2

(12) United States Patent
Gomes de Oliveira et al.

(10) Patent No.: US 11,222,116 B2
(45) Date of Patent: Jan. 11, 2022

(54) HEARTBEAT SIGNAL VERIFICATION

(71) Applicant: Hewlett-Packard Development Company, L.P., Houston, TX (US)

(72) Inventors: Marcelo Gomes de Oliveira, Porto Alegre (BR); Diogo Cesa Rosa, Porto Alegre (BR); Fernando Ferretto, Porto Alegre (BR); Charles R Staub, Porto Alegre (BR); Lan Wang, Cypress, TX (US); Vali Ali, Cypress, TX (US); James R Waldron, Houston, TX (US); Tiago V de Quadros Weber, Porto Alegre (BR); Julio Cesar Sa Campao, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 260 days.

(21) Appl. No.: 15/770,537

(22) PCT Filed: Feb. 3, 2016

(86) PCT No.: PCT/US2016/016369
§ 371 (c)(1),
(2) Date: Apr. 24, 2018

(87) PCT Pub. No.: WO2017/135942
PCT Pub. Date: Aug. 10, 2017

(65) Prior Publication Data
US 2019/0065747 A1 Feb. 28, 2019

(51) Int. Cl.
*H04L 29/00* (2006.01)
*G06F 21/57* (2013.01)
(Continued)

(52) U.S. Cl.
CPC ............. *G06F 21/57* (2013.01); *G06F 21/52* (2013.01); *G06F 21/554* (2013.01);
(Continued)

(58) Field of Classification Search
CPC ........ G06F 21/57; G06F 21/52; G06F 21/554; H04L 9/0643
(Continued)

(56) References Cited

U.S. PATENT DOCUMENTS

| 7,254,237 B1 * | 8/2007 | Jacobson | .................. H04L 9/32 380/277 |
| 7,650,495 B2 * | 1/2010 | Morais | .............. H04L 29/12009 713/155 |

(Continued)

OTHER PUBLICATIONS

Petr Marchenko et al., "Structuring Protocol Implementations to Protect Sensitive Data", Jun. 3, 2010.

*Primary Examiner* — Jeffrey C Pwu
*Assistant Examiner* — Michael D Anderson
(74) *Attorney, Agent, or Firm* — HPI Patent Department

(57) ABSTRACT

Examples associated with heartbeat signal verification are disclosed. One example includes verifying a provisioning key using a trusted key. The provisioning key is received from a remote device via an intermediary process. An intermediate key provided by the intermediary process is verified using the provisioning key. A session identifier encrypted using the intermediate key and provided to the intermediary process. A first heartbeat signal is received from intermediary process. The heartbeat signal is generated based on the session identifier.

12 Claims, 6 Drawing Sheets

(51) Int. Cl.
*G06F 21/52* (2013.01)
*G06F 21/55* (2013.01)
*H04L 9/06* (2006.01)
*H04L 9/08* (2006.01)
*H04L 9/30* (2006.01)
*H04L 9/32* (2006.01)
*G06F 21/60* (2013.01)

(52) U.S. Cl.
CPC .......... *H04L 9/0643* (2013.01); *H04L 9/0894* (2013.01); *H04L 9/302* (2013.01); *H04L 9/321* (2013.01); *H04L 9/3297* (2013.01); *G06F 21/606* (2013.01); *G06F 2221/034* (2013.01); *G06F 2221/2103* (2013.01); *G06F 2221/2139* (2013.01); *H04L 2209/38* (2013.01)

(58) Field of Classification Search
USPC ......................................................... 713/155
See application file for complete search history.

(56) References Cited

U.S. PATENT DOCUMENTS

| | | | |
|---|---|---|---|
| 7,715,559 | B2 | 5/2010 | Rainbolt et al. |
| 8,209,744 | B2 | 6/2012 | Zhu et al. |
| 8,763,084 | B2 * | 6/2014 | Mower ................ H04L 67/025 |
| | | | 726/3 |
| 8,892,886 | B2 | 11/2014 | Konrad et al. |
| 2008/0310337 | A1 * | 12/2008 | Welles ................ H04L 41/0803 |
| | | | 370/311 |
| 2009/0217034 | A1 | 8/2009 | Sudia et al. |
| 2010/0037323 | A1 | 2/2010 | Lemieux |
| 2012/0201381 | A1 | 8/2012 | Miller |
| 2013/0340088 | A1 | 12/2013 | Thadikaran et al. |
| 2014/0089659 | A1 * | 3/2014 | Brickell ................ G06F 21/572 |
| | | | 713/155 |
| 2015/0271155 | A1 | 9/2015 | Ronca |

* cited by examiner

HEARTBEAT SIGNAL VERIFICATION

BACKGROUND

Computer security is an important consideration whenever a person or company operates a computer today. Security solutions often include intrusion prevention techniques, threat detection techniques, and so forth, and strong security solutions employ a wide variety of techniques. If a computer is not protected from malicious threats, data on the computer could be inappropriately accessed, the computer could be used by an attacker, the computer could be irreparably damaged, and so forth.

BRIEF DESCRIPTION OF THE DRAWINGS

The present application may be more fully appreciated in connection with the following detailed description taken in conjunction with the accompanying drawings.

DETAILED DESCRIPTION

Figure 1:
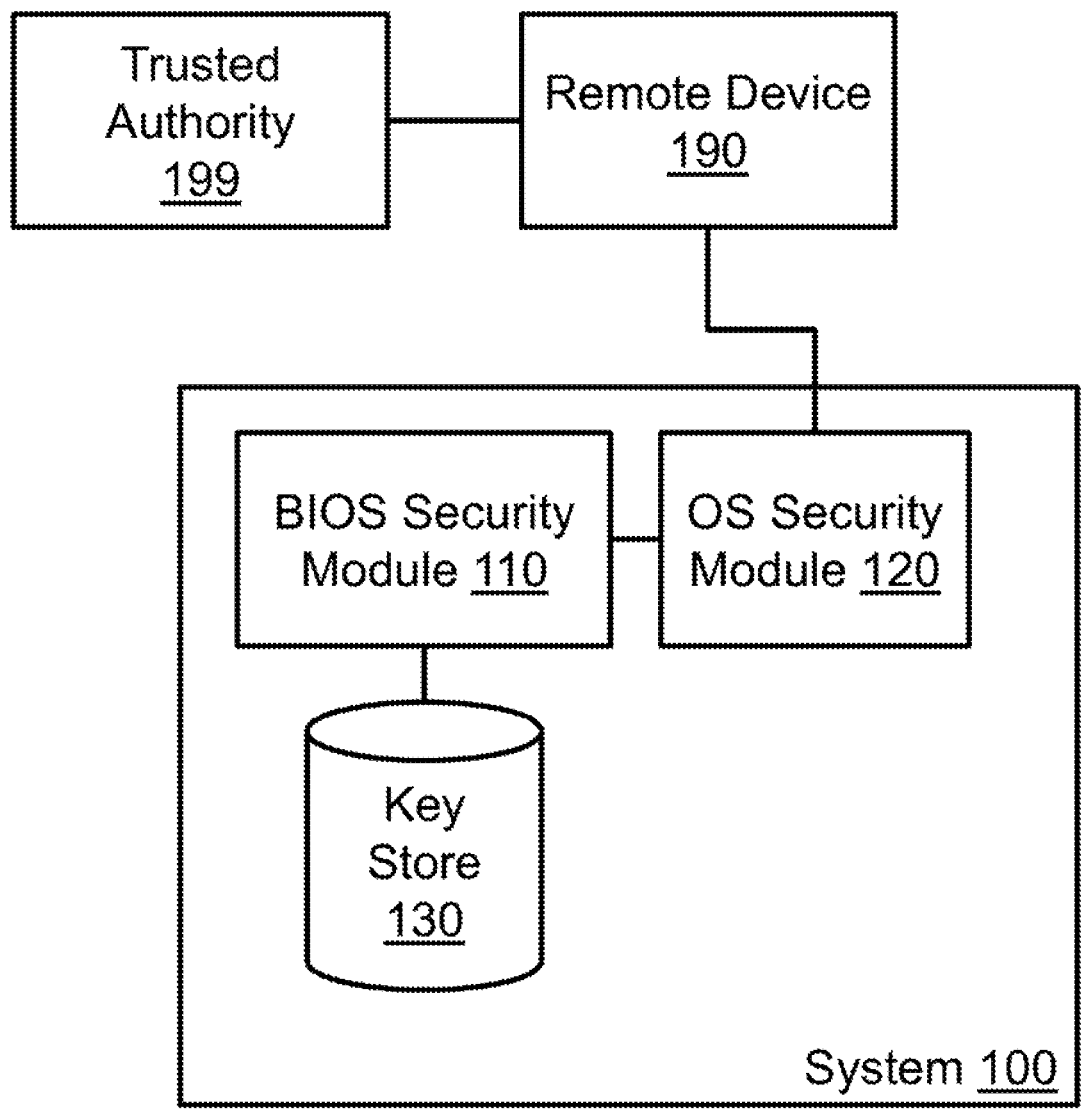
FIG. 1 illustrates an example system associated with heartbeat signal verification.

Systems, methods, and equivalents associated with heartbeat signal verification are described. A system (e.g., personal computer, mobile device, server) may have several different processes that perform functions associated with ensuring that the system remains secure. These systems may protect data, prevent malware from being installed, and so forth. In some examples, a system may have a first process for security that operates at the firmware (e.g., basic input/output system—BIOS) level of the system. The system may also have a process that operates at an operating system level. Though the firmware level process may be more difficult to remove or subvert because it can be tied to system firmware, the operating system level process may have stronger capabilities than the firmware level process. This may be because, for example, the operating system level process has access to more system resources than the firmware level process, the operating system level process can be more easily configured to protect other applications operating at the operating system level, and so forth.

Consequently, it may be desirable for the firmware level process to ensure continued operation of the operating system level process. If the operating system level process ceases functioning due to, for example, a malware, a user action, and so forth, the firmware level process can take a remedial action to secure the system. These actions may include, for example, disabling functionality of the system, locking down the system, reinstalling and/or reactivating the operating system level process, and so forth.

One manner by which the firmware level process can ensure continued operation of the operating system level process is via a heartbeat signal sent periodically from the operating system level process to the firmware level process. However, if an attacker can mimic the heartbeat signal, the attacker may be able to convince the firmware level process that the operating system level process is still functioning when it has actually been disabled. Thus, to establish security of the heartbeat signal, the firmware level process and the operating system level process may establish a chain of trust for secure communications using a series of public-private keys. First, the operating system level process may obtain a provisioning key from an external device (e.g., remote server). The provisioning key may be digitally signed by a trusted authority using a private key half of a trusted key which is known to be secure by both the firmware level process and the operating system level process. The trusted key may be a public key half of a pair of keys and may be stored in a secure storage accessible to the firmware level process. The operating system level process may then create an intermediate key and have that signed by the external device using the private-key half of the provisioning key. The public key half of the intermediate key may be used by the firmware level process to securely send the operating system level process a session identifier. This session identifier may be used as the basis for a series of heartbeat signals transmitted from the operating system level process to the firmware level process.

In various examples, the firmware level process may respond to heartbeat signals with signals to the operating system level process containing a series of nonces. Each nonce may be used by the operating system level process, in combination with the session identifier, to generate the next heartbeat signal to be provided by the operating system level process to the firmware level process.

FIG. 1 illustrates an example system associated with heartbeat signal verification. It should be appreciated that the items depicted in FIG. 1 are illustrative examples and many different systems, and so forth, may operate in accordance with various examples.

FIG. 1 illustrates a system 100 associated with heartbeat signal verification. FIG. 1 includes a firmware security module 110. System 100 also includes an operating system security module 120. These security modules may be tasked with a variety of functions associated with preventing processes and/or data associated with system 100 from becoming compromised. By way of illustration, operating system security module 120 may hinder installation of malware, prevent unauthorized access to data associated with system 100, prevent interference with other operating system level applications, and so forth. Firmware level security module 110 may be able to, for example, prevent improper use of lower level system resources, restore a state of system 100 in the event an intrusion is detected, and so forth. Security modules 110 and 120 may also perform a wide variety of other functions depending, for example, on the technical design of system 100 (e.g., system components), the purpose system 100 is designed to achieve (e.g., personal computer, server), other processes and/or applications operating on system 100, and so forth.

In some examples, firmware security module 110 may be tasked with hindering and/or deterring removal of operating system security module 120. By way of illustration, if firmware security module 110 detects that operating system security module 120 has been removed, firmware security module may take some action to protect system 100, system 100's data, and so forth. These actions may include, for example, reinstalling operating system security module 120, turning off system 100, locking access to data on system 100, and so forth.

Hindering removal of operating system security module 120 may be achieved using a variety of techniques. One technique may include a periodic exchange of signals between firmware security module 110 and operating system security module 120. In examples described herein, heartbeat signals may be sent from operating system security module 120 to firmware security module 110. Firmware security module 110 may acknowledge the heartbeat signals with information (e.g., a nonce) that may be used to generate a future heartbeat signal.

However, heartbeat signals on their own may not sufficiently hinder removal of operating system security module if the heartbeat signals can be spoofed or simulated by an attacker. Consequently, firmware security module 110 and operating system security module may seek to encrypt transmissions between one another to increase the complexity of spoofing the heartbeat signals and/or responses to the heartbeat signals.

To that end, before transmission of heartbeat signals begins, firmware security module 110 and operating system security module 120 may go through a process to securely encrypt their communications. First operating system security module 120 may obtain a provisioning key from a remote device 190. The provisioning key may be a public key half of a public-private key. In some examples, remote device 190 itself may create the provisioning key and the private key half of the provisioning key. Remote device 190 may retain the private key half of the provisioning key, and have a trusted authority 199 sign the provisioning key before providing the provisioning key to operating system security module 120.

Trusted authority 199 may be some trusted entity (e.g., manufacturer, operating system distributor, security company) that can guarantee an acceptable degree of protection regarding the private key half of the trusted key to prevent an attack involving signing a provisioning key with malicious intent. Trusted authority 199 may sign the provisioning key with the private key half of another public-private key pair. The public key half to this private key may be a trusted key that is stored in a key store 130. Key store 130 may be a secure storage accessible to firmware security module 110. Other resources of system 100 (e.g., operating system security module 120, other processes) may also be able to access key store 130 or portions of key store 130. In various examples, the trusted key may be stored in key store 130 prior to an initial operation of system 100. For example, when system 100 is put together in a factory, the trusted key may be embedded within key store 130. In another example, the trusted key may be stored in key store 130 during operating system installation for system 100.

Once operating system security module 120 receives the provisioning key from remote device 190, operating system security module 120 may pass the provisioning key to firmware security module 110. At this point firmware security module 110 may verify the provisioning key using the trusted key from key store 130 to check that trusted authority 199 properly signed the provisioning key. In some examples, firmware security module 120 may also compare a timestamp associated with the provisioning key to a timestamp associated with a prior provisioning key. If the timestamp associated with the provisioning key is later than the timestamp associated with the prior provisioning key, then firmware security module 110 may store the provisioning key (e.g., in key store 130). Comparing the timestamps may prevent an attacker from submitting an old provisioning key to, for example, disrupt communications, trick firmware security module 110 into using a compromised provisioning key, and so forth.

Once firmware security module 110 has verified the provisioning key, operating system security module 120 may then generate an intermediate key. The intermediate key may be a public key half of a public-private key pair. Operating system security module 120 may have remote device 190 sign the intermediate key using the private key half of the provisioning key. Similarly to trusted authority 199, remote device 190 may be operated by some known trusted organization (e.g., manufacturer, security company). By way of illustration, remote device 190 may be a server tasked with generating public-private key pairs for the purpose of securing communications between entities. Though, the trusted key could be used for verifying the intermediate key, the more public-private key pairs are used, the more likely they are to become compromised. Consequently, because the trusted key may have been embedded in key store 130 in a manner that is difficult to modify, it may be desirable to use the trusted key and the private key half of the trusted key on a limited basis.

Once operating system security module 120 has had remote device 190 sign the intermediate key with the private key half of the provisioning key, operating system security module 120 may provide the intermediate key to firmware security module 110. At this point, firmware security module 110 may verify that remote device 190 has signed the intermediate key using the provisioning key. As with the provisioning key, firmware security module 110 may also compare timestamps of the intermediate key and a prior intermediate key to prevent verification of an out of date intermediate key.

Using the intermediate key, firmware security module 110 may encrypt a session identifier and transmit the session identifier to operating system security module 120. The session identifier may serve as a basis for communication of heartbeat signals between firmware security module 110 and operating system security module 120. Operating system security module 120 may then decrypt and store the session identifier.

Using the session identifier, operating system security module 120 may begin transmitting heartbeat signals to firmware security module 110. The heartbeat signals may be generated at least in part based on the session identifier. For example, in some examples, where SID refers to the session identifier a NONCE refers to a nonce value provided to operating system module from firmware security module, the heartbeat signals HB may have the form generated according to equation 1:

$$HB_n = SHA2(SID \text{ xor } NONCE_{n-1}) \qquad 1.$$

Upon receiving a heartbeat signal, because firmware security module 110 knows both the previous nonce and the session ID, firmware security module 110 may recalculate equation 1 and compare the result to the value received from operating system module 120. If the recalculated result heartbeat signals differ, firmware security module 110 may take some remedial action, wait for a new heartbeat signal, and so forth. Upon receiving the heartbeat signal, firmware security module 110 may then send a new nonce to operating system security module 120 for use in generating the next heartbeat signal.

In some examples, firmware security module 110 may not have provided a session identifier to operating system security module 120 for the first heartbeat signal. In these examples, the first heartbeat signal may be generated, for example, by taking the SHA2 of the session identifier, the session identifier XOR'ed with itself, and so forth. In other examples, firmware security module 110 may provide an initial nonce to operating system security module 120 with the session identifier, in a separate signal prior to the first heartbeat signal, and so forth.

In the event that firmware security module 110 fails to receive a heartbeat signal after a predetermined period of time, firmware security module may take some form of remedial action. These actions may include, for example, re-initiating operating system security module 120, alerting an operator of system 100, preventing use system 100, preventing access to certain resources (e.g., data) available to system 100, alerting an administrator, and so forth. These remedial actions may help to protect system 100 from attacks that remove operating system security module 120.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
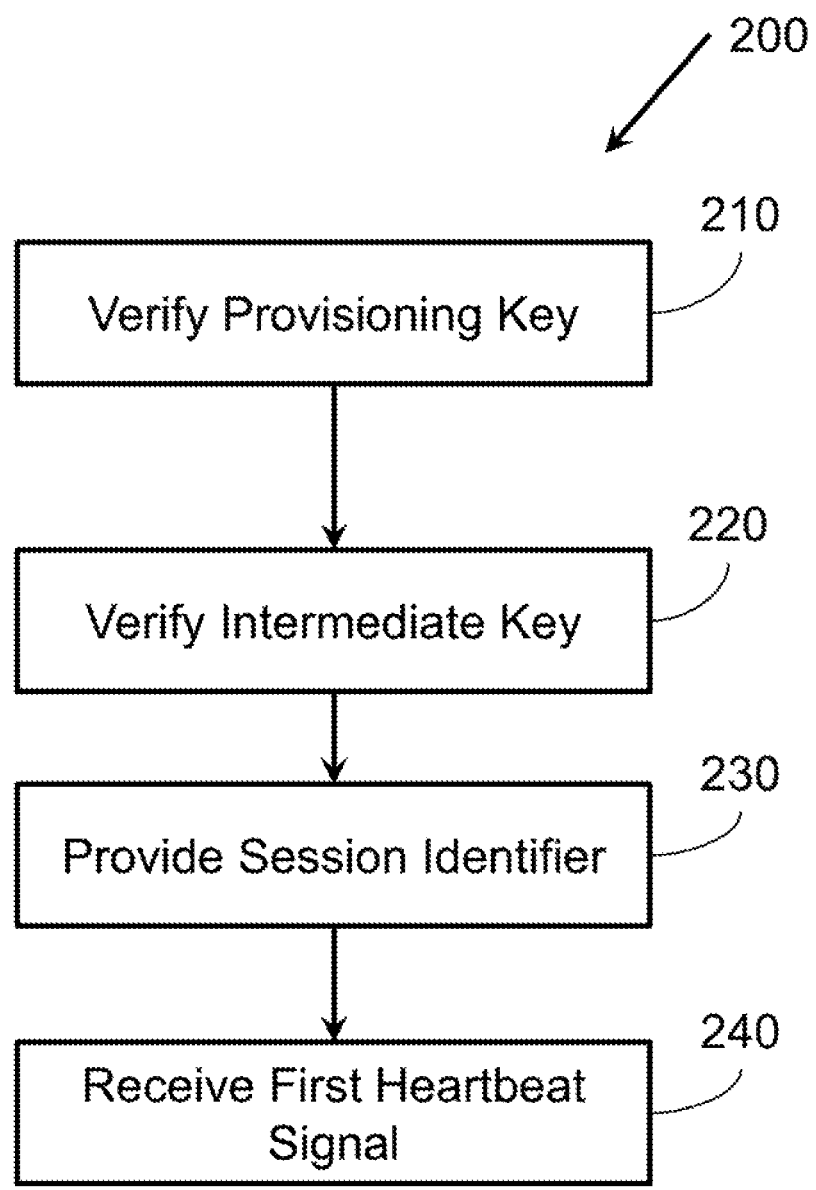
FIG. 2 illustrates a flowchart of example operations associated with heartbeat signal verification.

FIG. 2 illustrates an example method 200 associated with heartbeat signal verification. Method 200 may be embodied on a non-transitory computer-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes verifying a provisioning key at 210. The provisioning key may be provided by a remote device. The provisioning key may be provided by an intermediary process. The intermediary process and a process performing actions associated with method 200 may operate on the same device (e.g., computer). The verification at action 210 may be performed using a trusted key. The trusted key may be a public key half of a public-private key generated according to RSA. In this example, the private key half may be controlled by a trusted authority. The public key half may have been embedded in a secure storage of a computer on which method 200 is being performed prior to initial operation of the computer. For example, the public key half may be embedded into the secure storage during initial setup of the computer, while or prior to the computer being physically constructed, and so forth.

The provisioning key may also be a public key half of a public-private key generated according to RSA. The provisioning key may operate on a temporary basis and/or be used more widely than the trusted key. In some examples, the remote device may generate the provisioning key. Subsequently, the provisioning key may be signed by a trusted authority using a trusted private key that is the private key half of the trusted key.

Consequently, verifying the provisioning key may include ensuring the provisioning key is properly signed by the trusted authority. The trusted authority may sign the provisioning key using the trusted private key, which the process may detect using the trusted key. Verifying the provisioning key may also include ensuring a timestamp associated with the provisioning key exceeds a timestamp of a previous provisioning key. This may prevent an attacker from convincing the process to use an old provisioning key that could have been compromised or otherwise disrupt communications between the process and the intermediary process.

Method 200 also includes verifying an intermediate key at 220. The intermediate key may be provided by the intermediary process. The intermediate key may be verified using the provisioning key. The intermediate key may also be a public key half of a public-private key generated according to RSA. The intermediate key may be generated by the intermediary process. The intermediate key may be signed by the remote device using a provisioning private key that is paired with the provisioning key.

Similar to the trusted key, verifying the intermediate key may include ensuring the intermediate key is properly signed by the remote device. The remote device may sign the intermediate key using the provisioning private key, which may be verified using the provisioning key. Verifying the intermediate key may also include ensuring a timestamp associated with the intermediate key exceeds a timestamp associated with a previous intermediate key.

Method 200 also includes providing a session identifier at 230. The session identifier may be provided to the intermediary process. The session identifier may be provided in an encrypted form using the intermediary key. This may allow the intermediary process to decrypt the session identifier using a private key half of the intermediary key.

Method 200 also includes receiving a first heartbeat signal at 240. The first heartbeat signal may be received from the intermediary process. The first heartbeat signal may be generated based on the session identifier. Additionally, the first heartbeat signal may be generated by encrypting the session identifier using SHA-2.

Figure 3:
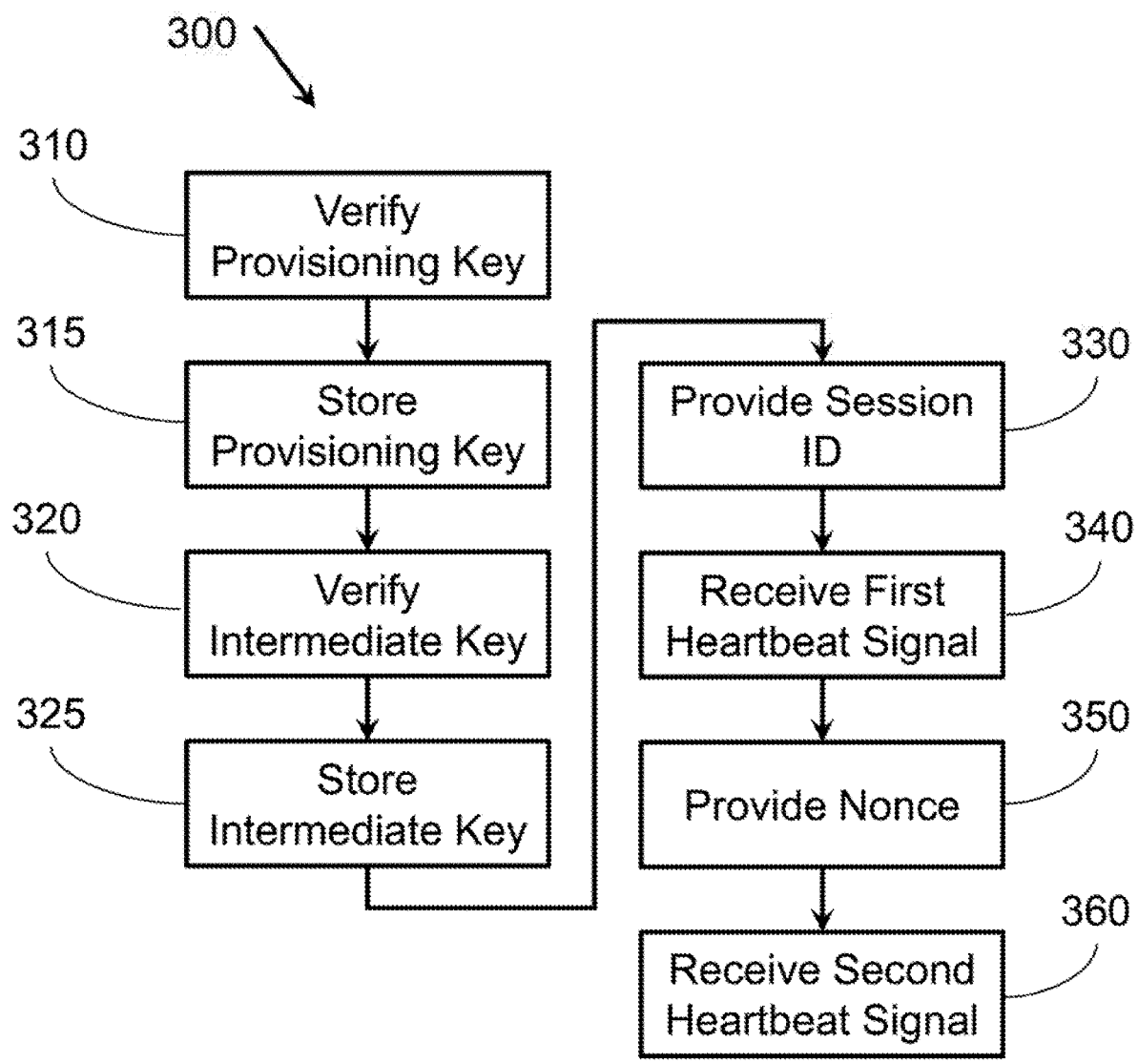
FIG. 3 illustrates another flowchart of example operations associated with heartbeat signal verification.

FIG. 3 illustrates a method 300 associated with heartbeat signal verification. FIG. 3 includes several actions similar to those described above with reference to method 200. For example, method 300 includes verifying a provisioning key at 310, verifying an intermediate key at 320, providing a session identifier at 330, and receiving a first heartbeat signal 340.

Method 300 also includes storing the provisioning key at 315. Storing the provisioning key in, for example, a secure storage, may facilitate verifying the intermediate key at action 320. Method 300 also includes storing the intermediate key at 325. This may facilitate secure provision of the session identifier to the intermediary process at action 330.

Method 300 also includes providing a nonce at 350. The nonce may be provided to the intermediary process in response to the first heartbeat signal. Method 300 also includes receiving a second heartbeat signal from the intermediary process at 360. The second heartbeat signal may be generated based on the session identifier and the nonce. By way of illustration, the second heartbeat signal may be generated by applying an XOR operator to the session identifier and the nonce, and then encrypting the result using SHA-2.

Subsequently, actions 350 and 360 may be repeated as long as a device performing method 300 is operating. When the intermediary process receives a heartbeat signal, a new nonce may be provided, which may be used to generate the next heartbeat signal.

Figure 4:
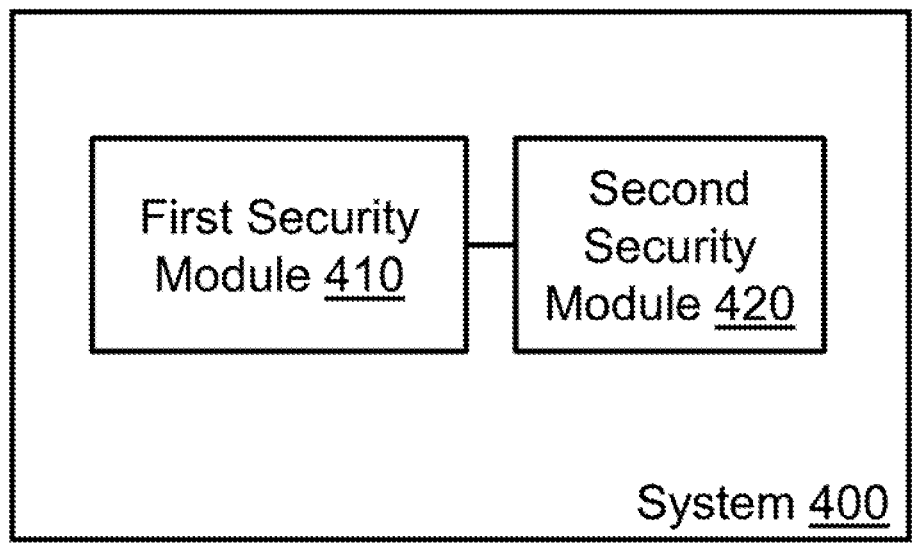
FIG. 4 illustrates an example system associated with heartbeat signal verification.

FIG. 4 illustrates a system 400 associated with heartbeat signal verification. System 400 includes a first security module 410. First security module 410 may verify a series of public-private keys received from a second security module 420. Verifying the series of public-private keys may establish a chain of trust for a session identifier. The session identifier may be used during communications between first security module 410 and second security module 420. First security module 410 may operate within the firmware of system 400.

System 400 also includes second security module 420 that operates at an operating system level of system 400. Second security module 420 may provide period heartbeat signals to first security module 420. The periodic heartbeat signals may be generated as a function of the session identifier. Additionally, the periodic heartbeat signals may be generated based on nonces received from first security module 410. The nonces may be received in response to previous heartbeat signals, and nonces may be used to generate a single periodic heartbeat signal. The periodic heartbeat signals may be provided from first security module 420 to second security module 410 in an encrypted form.

In one example, the heartbeat signals may be generated by applying a SHA-2 function to an XOR of the session identifier and a previous nonce. The first security module, which knows bot the session identifier and the nonce, may verify the validity of the heartbeat signal, by recalculating the heartbeat signal and comparing the result to the heartbeat signal actually received. In some examples, second security module 420 may provide first security module 410 an initial heartbeat signal generated without a nonce provided by first security module 410. First security module 410 may provide an initial nonce in response to the initial heartbeat signal, and subsequent heartbeat signals may be generated based on the nonce. In an alternative example, first security module 410 may provide second security module 420 an initial nonce in the signal containing the session identifier, allowing the initial heartbeat signal to be generated based on both the initial nonce and the session identifier.

When first security module 410 fails to receive a valid heartbeat signal after a predetermined period of time, first security module may perform a remedial action. This may hinder undetected removal of second security module 420. Further due to the manner of encrypting heartbeat signals, spoofing the heartbeat signals may also be difficult for an attacker attempting to remove second security module 420, further hindering undetected removal of second security module 420. In various examples, the remedial action may include, forcing shutdown of system 400, reinstalling second security module 420, alerting an external device, and so forth.

Figure 5:
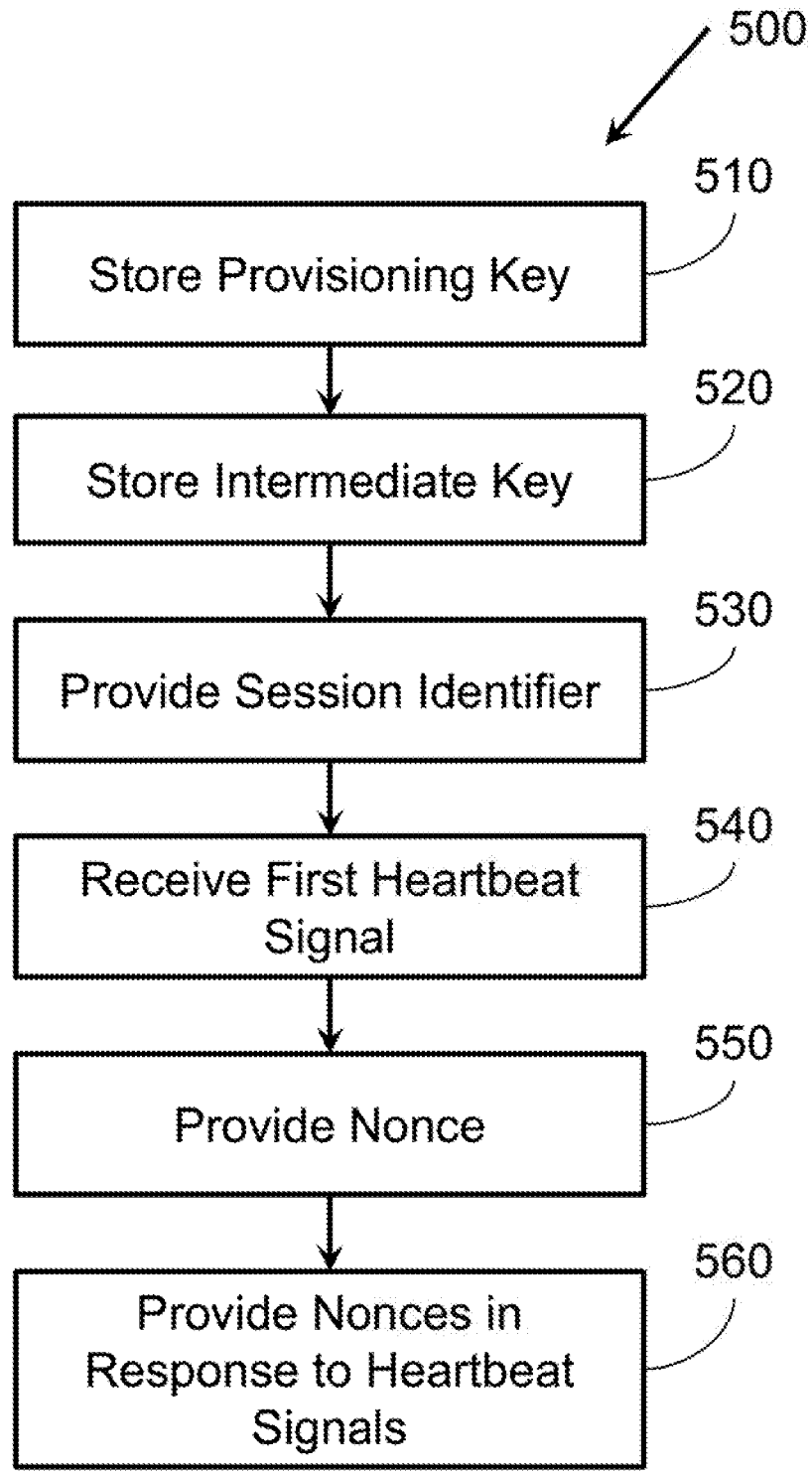
FIG. 5 illustrates another flowchart of example operations associated with heartbeat signal verification.

FIG. 5 illustrates a method 500 associated with heartbeat signal verification. Method 500 includes storing a provisioning key at 510. The provisioning key may be received from a remote device via an intermediary process. The provisioning key may be stored when the provisioning key has been signed by a trusted authority and when the provisioning key has a first timestamp that exceeds a timestamp associated with a prior provisioning key.

Method 500 also includes storing an intermediate key at 520. The intermediate key may be received from the intermediary process. The intermediate key may be stored when the intermediate key has been signed by the remote device and has a second timestamp that exceeds a timestamp associated with a prior intermediate key.

Method 500 also includes providing a session identifier to the intermediary process using the intermediate key. Method 500 also includes receiving a first heartbeat signal from the intermediary process. The heartbeat signal may be generated based on the session identifier. Method 500 also includes providing a nonce to the intermediary process in response the first heartbeat signal.

Method 500 also includes providing nonces to the intermediary process. Each nonce may be generated in response to a subsequent heartbeat signal received from the intermediary process. Consequently, each subsequent heartbeat signal may be generated based on the session identifier and on a nonce provided in response to a prior heartbeat signal.

In some examples, method 500 also includes performing a remedial action (not shown). In these actions, the remedial action may be taken upon failing to receive a heartbeat signal from the intermediary process after a predetermined period of time. As discussed above, a missed heartbeat signal may indicate a security breach and the remedial action may attempt to fix or limit effects of the security breach.

Figure 6:
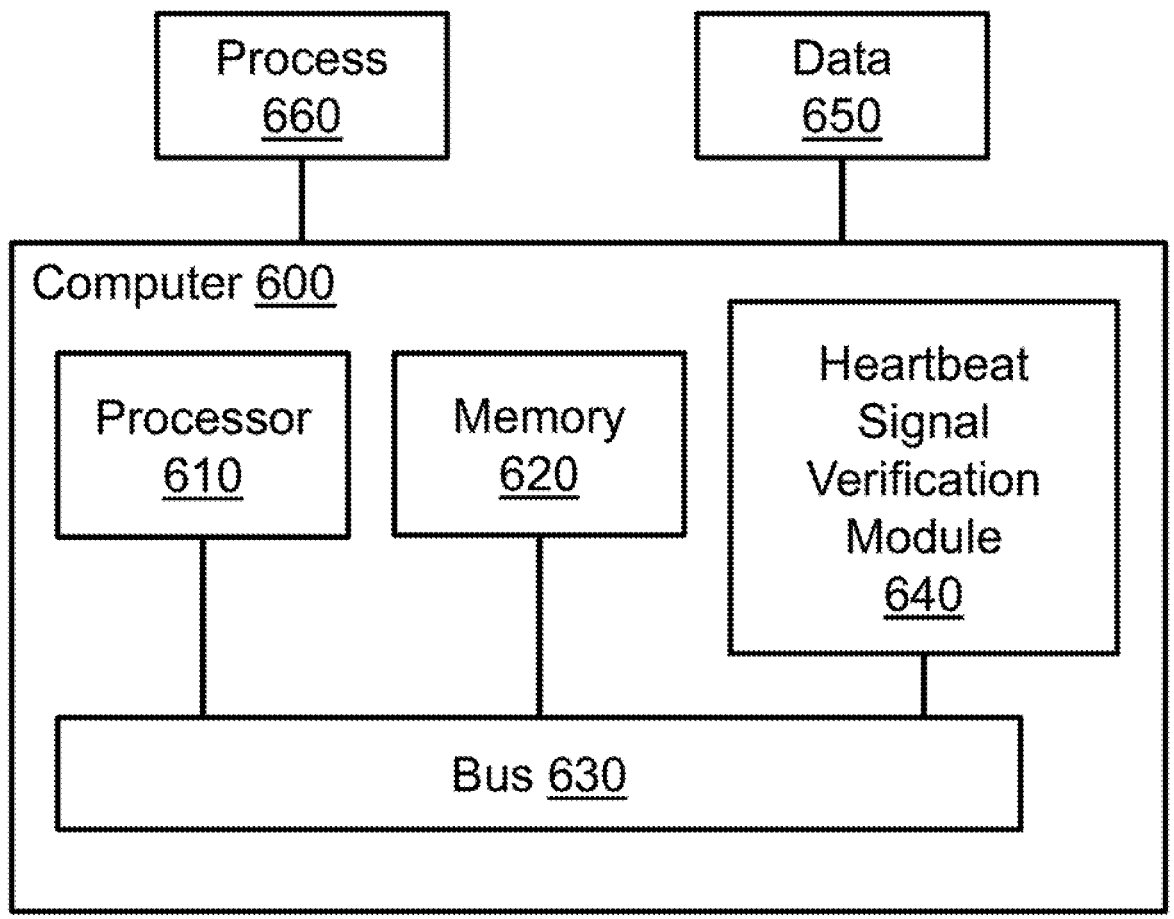
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a heartbeat signal verification module 640. Heartbeat signal verification module 640 may perform, alone or in combination, various functions described above with reference to the example systems, methods, apparatuses, and so forth. In different examples, heartbeat signal verification module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
   verifying, via a firmware security module of a computing device, a provisioning key provided by a remote device, where the verification is performed using a trusted key;
   verifying, via the firmware security module, an intermediate key provided by an operating system security module of the computing device, where the intermediate key is verified using the provisioning key;
   providing, via the firmware security module, a session identifier that is encrypted using the intermediate key to the operating system security module;
   receiving, via the firmware security module, a first heartbeat signal generated based on the session identifier from the operating system security module;
   sending, via the firmware security module, a nonce to the operating system security module in response to receiving the first heartbeat signal and verifying the session identifier; and
   receiving, via the firmware security module, a second heartbeat signal generated based on the session identifier and the nonce from the operating system security module.

2. The method of claim 1, where the second heartbeat signal is generated in part by applying an XOR operation to the session identifier and the nonce, and encrypting a result using SHA-2.

3. The method of claim 1 where the trusted key, the provisioning key, and the intermediate key are public key halves of public-private keys generated according to RSA.

4. The method of claim 3, comprising:
   storing the provisioning key; and
   storing the intermediate key.

5. The method of claim 3, where the provisioning key is generated by the remote device and where the provisioning key is signed by a trusted authority using a trusted private key paired with the trusted key.

6. The method of claim 3, where the intermediate key is generated by the operating system security module, and where the intermediate key is signed by the remote device using a provisioning private key paired with the provisioning key.

7. The method of claim 1, where a condition of verifying the provisioning key includes ensuring a timestamp associated with the provisioning key exceeds a timestamp of a previous provisioning key and where a condition of verifying the intermediate key includes ensuring a timestamp associated with the intermediate key exceeds a timestamp of a previous intermediate key.

8. A computing device, comprising:
   a first security module to verify a series of public-private keys received from a second security module of the computing device to establish a chain of trust for a session identifier to be used when the first security module and the second security module communicate with one another, where the first security module is to operate at a firmware level, and where the second security module is to operate at an operating system level; and
   the second security module to provide periodic heartbeat signals to the first security module, where the periodic heartbeat signals include a first periodic heartbeat signal generated by encrypting a session identifier and a second periodic heartbeat signal generated by encrypting the session identifier a nonce received from the first security module in response to verifying the session identifier from the first periodic heartbeat signal.

9. The computing device of claim 8, where the first security module is to perform a remedial action after failing to receive a heartbeat signal after a predetermined period of time.

10. The system computing device of claim 8, where nonces are used to generate a single periodic heartbeat signal.

11. A non-transitory computer-readable medium storing computer-executable instructions that when executed by a computing device cause the computing device to:
    store a provisioning key, received from a remote device via an operating system security module of the computing device, when the provisioning key has been signed by a trusted authority and has a first timestamp that exceeds a timestamp associated with a prior provisioning key, where the operating system security module is to operate at an operating system level;
    store an intermediate key received from the operating system security module via a firmware security module of the computing device, when the intermediate key has been signed by the remote device and has a second timestamp that exceeds a timestamp associated with a prior intermediate key, where the firmware security module is to operate at a firmware level;
    provide a session identifier from the firmware security module to the operating system security module using the intermediate key;
    receive a first heartbeat signal, at the firmware security module, from the operating system security module, where the first heartbeat signal is generated in part by encrypting the session identifier using SHA-2;
    provide a nonce to the operating system security module in response to verifying the session identifier of the first heartbeat signal;
    receive a second heartbeat signal, at the firmware security module, from the operating system security module, where the second heartbeat signal is generated in part by encrypting the session identifier and the nonce using SHA-2; and
    provide subsequent nonces in response to verifying the session identifier and corresponding nonces of the subsequent heartbeat signals from the operating system security module, where each subsequent heartbeat signal is generated based on the session identifier and on a nonce provided in response to a prior heartbeat signal.

12. The non-transitory computer-readable medium of claim 11, wherein the instructions when executed further cause the computing device to perform a remedial action upon failing to receive a heartbeat signal after a predetermined period of time.

* * * * *